United States Patent [19]

Hegner et al.

[11] Patent Number: 5,005,421
[45] Date of Patent: Apr. 9, 1991

[54] PRESSURE SENSOR AND METHOD FOR THE MANUFACTURE THEREOF

[75] Inventors: Frank Hegner, Maulburg; Gerhard Dittrich, Lörrach; Thomas Klähn, Steinen, all of Fed. Rep. of Germany

[73] Assignee: Endress u. Hauser GmbH u. Co., Fed. Rep. of Germany

[21] Appl. No.: 381,502

[22] Filed: Jul. 18, 1989

[30] Foreign Application Priority Data

Jul. 22, 1988 [DE] Fed. Rep. of Germany ....... 3825029
Jan. 19, 1989 [DE] Fed. Rep. of Germany ....... 3901492

[51] Int. Cl.⁵ ............................ G01L 7/08; G01L 9/12
[52] U.S. Cl. ........................................ 73/72; 29/25.41; 361/283
[58] Field of Search .................. 73/718, 724; 361/283; 29/595, 621.1, 25.41; 92/103 R, 103 SD, 103 F

[56] References Cited

U.S. PATENT DOCUMENTS

| | | | |
|---|---|---|---|
| 3,376,376 | 4/1968 | Smith | 174/52 |
| 3,405,559 | 10/1968 | Moffett | 73/324 |
| 3,993,939 | 11/1976 | Slavin et al. | 317/246 |
| 4,064,550 | 12/1977 | Dias et al. | 361/283 |
| 4,177,496 | 12/1979 | Bell et al. | 361/283 |
| 4,184,189 | 1/1980 | Davis et al. | 361/283 |
| 4,388,668 | 6/1983 | Bell et al. | 361/283 |
| 4,426,673 | 1/1984 | Bell et al. | 361/283 |
| 4,716,492 | 12/1987 | Charboneau et al. | 73/718 |
| 4,934,193 | 6/1990 | Hayata | 73/727 |

FOREIGN PATENT DOCUMENTS

| | | |
|---|---|---|
| 2021479 | 11/1971 | Fed. Rep. of Germany . |
| 2556947 | 7/1976 | Fed. Rep. of Germany . |
| 2631883 | 3/1977 | Fed. Rep. of Germany . |
| 2709945 | 9/1977 | Fed. Rep. of Germany . |
| 2715339 | 10/1978 | Fed. Rep. of Germany . |
| 3137219 | 4/1983 | Fed. Rep. of Germany ........ 73/724 |
| 1540765 | 2/1979 | United Kingdom . |

Primary Examiner—Donald O. Woodiel
Attorney, Agent, or Firm—Barnes & Thornburg

[57] ABSTRACT

The pressure sensor comprises a base body and diaphragm which are assembled at a defined distance apart parallel to each other to form a chamber, at least one of the two assembled parts consisting of ceramic, glass, metal or a monocrystalline material. In dependence upon the external pressure acting on the pressure sensor the distance between said parts and thus the capacitance between two electrodes carried by said parts changes. The base body and the diaphragm are firmly connected together by a shaped part of metal serving at the same time as spacer. If at least one of the two parts consists of ceramic, glass, metal or a monocrystalline material, the two joined parts can be soldered together by a shaped part of active solder. If the two assembled parts consist of oxide ceramic or sapphire they can be connected together by the direct copper bonding method. In this case the shaped part consists of copper which is connected to the two parts by a eutectic melt forming at the surface.

17 Claims, 1 Drawing Sheet

PRESSURE SENSOR AND METHOD FOR THE MANUFACTURE THEREOF

The invention relates to a pressure sensor comprising a base body and a diaphragm which are assembled at a defined distance apart parallel to each other to form a chamber, at least one of the two assembled parts consisting of ceramic, glass, metal or a monocrystalline material, and a method for the manufacture of such a pressure sensor.

Pressure sensors of this type are known in which the diaphragm and the base body are connected together by a fused glass frit defining the spacing. This method of joining has the disadvantage that its mechanical strength, loadability and temperature change stability are small. Furthermore, the glass frit is only limitedly suitable for joining parts of non-oxide ceramic and extremely pure oxide ceramic which is the preferred material for the base body and the diaphragm of pressure sensors of the present type.

The problem underlying the invention is to provide a pressure sensor of the type indicated at the beginning which is very robust and in particular not sensitive to temperature shock and can contain components of difficultly joinable materials such as highly pure oxide ceramic, and a method for the manufacture of such a pressure sensor.

The pressure sensor according to the invention is characterized in that the base body and the diaphragm are thermally joined together by a shaped part of metal simultaneously serving as spacer.

For making the pressure sensor according to the invention in particular two methods known per se are suitable: the active soldering and the direct joining of copper to oxide ceramic or sapphire known under the designation "DCB"("direct copper bonding").

Both methods are excellently suited to the preferred case where the diaphragm and the base body of the pressure sensor consist of ceramic, in particular of highly pure oxide ceramic such as aluminium oxide ceramic. Moreover, by active soldering parts of other materials such as nonoxide ceramic, monocrystalline materials or glass, without previous metallization, as well as metallic or metallized parts can be soldered and in all cases no flux is necessary.

When the pressure sensor is made by active soldering the shaped part consists of active solder.

Active solder consists of a solder material, usually a hard solder, such as Ag, Ag-Cu or Ag-Cu-In, to which at least one reactive element, such as Ti, Zr, Be, Hf or Ta, has been alloyed. Ti has proved to be the most effective alloying element. The reactive element wets the surface of the parts to be soldered during the soldering. When the parts to be soldered consist of oxide ceramic the high affinity of the reactive element for oxygen effects a reaction with the ceramic which leads to the formation of mixed oxide and free chemical valencies.

A preferred method of manufacturing the pressure sensor by active soldering according to the invention resides in that the base body and the diaphragm with the shaped part of active solder disposed therebetween are introduced into a vacuum or a defined gas atmosphere of a pressure of at the most 0.1 mbar and heated therein until complete melting of the active solder.

If the diaphragm and the base body consist of oxide ceramic or sapphire and the pressure sensor is made by the DCB method the shaped body consists of copper which is connected to the two parts by a eutectic melt forming at the surface.

A preferred method of manufacturing the pressure sensor according to the DCB method resides according to the invention in that the base body and the diaphragm with the shaped body of copper disposed therebetween are brought into an inert atmosphere with a low oxygen content and heated therein to a temperature which lies beneath the melting point of copper and at which at the surface of the shaped part a eutectic melt forms.

Compared with the known pressure sensors with parts joined by glass frit, both the pressure sensors made by active soldering and those made by the DCB method are distinguished by higher mechanical strength, loadability and temperature change stability and by an improved and more reliable vacuum tightness. In particular, with these two methods parts comprising ceramics can also be joined which cannot be joined at all or cannot be joined easily by glass frit. The production methods are simpler both with active soldering and with the DCB method than when joining by glass frit. Finally, the quality of the joint can be checked rapidly and simply by X-ray examination.

The use of the DCB method is restricted to the joining of oxide ceramics and sapphire but this method has the advantage that the shaped part retains a high geometrical trueness at the joining temperature because it is not melted through but only initially melted at the surface. This makes it possible to obtain very good constancy of the spacing and parallelism of the base body and diaphragm without additional steps.

In contrast, a particular advantage of active soldering resides in that practically all materials can be joined therewith, such as oxide ceramics, non-oxide ceramics, glasses, monocrystals and metals.

In both cases it is surprising that in spite of the very different temperature dependencies of the coefficients of expansion of metal and ceramic a metal solder can be used for joining ceramic parts for pressure sensors. It was nevertheless impossible to determine in the pressure sensors made according to the invention within a large temperature range any disadvantageous effects on the sensor behaviour, such as creeping, hysteresis or sensitivity changes.

Further features and advantages of the invention will be apparent from the following description of an example of embodiment which is illustrated in the drawings, wherein.

Figure 1:
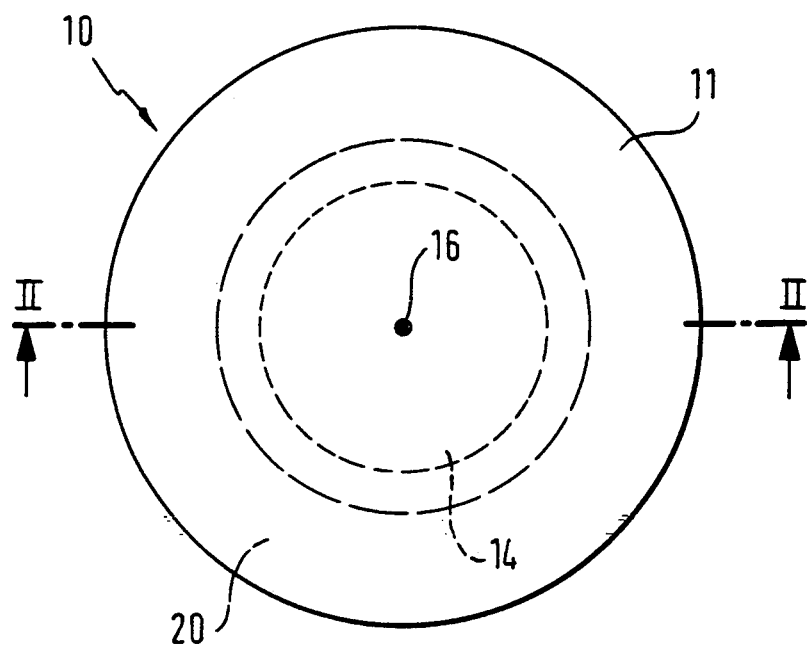
FIG. 1 is a plan view of a pressure sensor according to the invention.

The pressure sensor 10 illustrated in the drawings has a diaphragm 11 in the form of a circular disc with plane-parallel surfaces which is joined round the periphery to a circular base body 12 with a predetermined spacing d so that between the planar upper side of the base body 12 and the opposite surface of the diaphragm 11 a chamber 13 is formed. The diaphragm 11 may consist of ceramic, glass or a monocrystalline material. Similarly, the base body 12 may consist of ceramic, glass or a monocrystalline material, although the materials of which the diaphragm 11 and the base body 12 consist may be different from each other. The diaphragm 11 is resilient so that it can deform under a pressure acting thereon. The base body 12 may be solid and rigid but alternatively if desired it may be formed in the same manner as the diaphragm 11 as flat resilient disc.

On the surfaces of the diaphragm 11 and the base body 12 facing each other within the chamber 13 circular conductive layers 14 and 15 of metal are disposed which lie opposite each other in spaced relationship. To the conductive layer 14 a connecting lead 16 is connected which is led outwardly in gas-tight manner through the diaphragm 11. In the same manner, to the conductive layer 15 a connecting lead 17 is connected which is led outwardly in gas-tight manner through the base body 12. The two conductive layers form the electrodes of a capacitor of which the capacitance depends on the spacing between the conductive layers. When the diaphragm 11 deforms under the action of a pressure the distance between the two conductive layers and thus the capacitance of the sensor changes. The capacitance of the sensor, which can be measured by means of an electronic circuit connected to the connecting leads 16 and 17, is therefore a measure of the pressure acting on the diaphragm 11. If one of the two parts 11, 12 consists of metal, it can form the respective capacitor electrode itself.

The special feature of the pressure sensor illustrated resides in the manner in which the diaphragm 11 and the base body 12 are joined together. This is done by an annular shaped member 20 of metal which establishes a connection between the diaphragm 11 and the base body and serves at the same time as spacer in that it keeps the diaphragm 11 at the defined distance d from the base body 12. To establish the connection a thermal method is used which permits a direct connection of a diaphragm 11 and the base body 12 to the shaped body 20 without previous application of a metallization or use of a flux.

For this purpose in particular two methods known per se can be used:

1. active soldering, with which both metals and non-metals, such as ceramic, monocrystals and glass, can be directly soldered;
2. the direct joining of copper to oxide ceramic or sapphire known under the designation "DCB" ("direct copper bonding") for the case where the diaphragm 11 and the base body 12 consist of said materials.

In both cases a mechanically extremely strong and completely gas-tight joint is obtained between the diaphragm 11 and the base body 12 via the shaped part 20 so that the chamber 13, if desired, can be completely sealed gas-tight from the outside.

The two methods mentioned above will be explained hereinafter in detail:

1. Active soldering

Active solder is a solder containing at least one highly reactive element such as Ti, Zr, Be, Hf or Ta. These reactive elements wet the surface of the parts to be soldered during the soldering. If these parts consist of oxide ceramic the high affinity of the reactive elements for oxygen effects a reaction with the ceramic which leads to formation of mixed oxide and free chemical valencies.

The reactive component of the solder is embedded in a matrix of other alloy elements such as Ag-Cu. These form the actual solder material.

Figure 2:
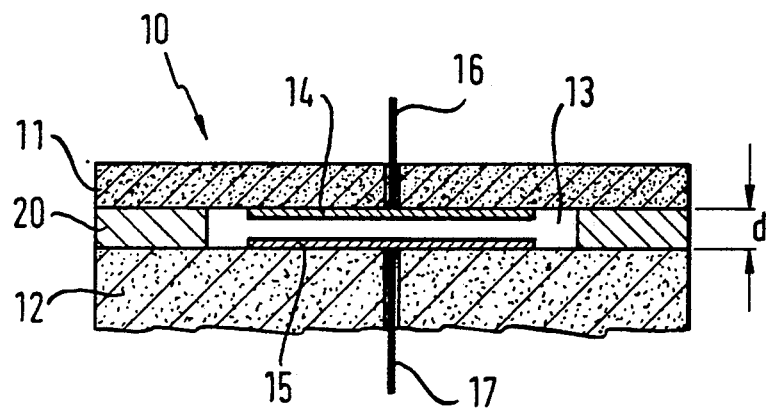
FIG. 2 is a sectional view of the pressure sensor of FIG. 1 along the section line II—II.

Modern active solder alloys are ductile and contain between 2 to 5 % Ti, which is homogeneously embedded in a matrix of for example Ag-Cu. These alloys can be formed like normal hard solders to any desired shaped parts, i.e. also the annular shaped part 20 shown in FIG. 2 and serving as spacer.

Typical active solders available commercially are the alloys Ag-Ti, Ag-Cu-Ti and Ag-Cu-In-Ti, the soldering temperatures of which lie between 750 and 1000° C. Stepped solderings (gradations in the melting points) are also possible with active solders. The strengths of the active solders are identical to the strengths of comparable Tifree hard solders The bonding strength to the ceramic is greater than the strength of the ceramic itself; thus, in a tensile test the breakage lies in the ceramic and not in the ceramic-solder interface.

The bonding of the ceramic parts with active solder is preferably carried out in a vacuum at at least $10^{-5}$ mbar, preferably in the range of $10^{-6}$ mbar. A very good vacuum is necessary to avoid reactions of the Ti with the remaining gas and obtain a good wetting of the ceramic.

To achieve certain soldering results, for example for reducing the evaporation of the solder or reducing surface oxides, it may be convenient to carry out the heating-up or soldering operation in a defined gas atmosphere of inert gas and/or reactive gas. The partial pressures of these gases are preferably below $10^{-1}$ mbar.

As in conventional soldering, in active soldering as well the solder is completely melted through. The solderSO ing temperature must however in active soldering lie preferably 70 to 100° C. above the liquidus temperature to obtain an optimum reaction of the Ti with the ceramic. This gives high strength and vacuum tightness.

2. DCB method

The use of the DCB method requires that the diaphragm 11 and the base body 12 consist of oxide ceramic or sapphire. In this case the annular shaped body 20 consists of copper. After the copper shaped body 20 has been arranged between the base body 12 and the diaphragm 11 this arrangement is heated in an inert gas atmosphere, for example of argon or nitrogen, with small proportions of oxyge (e.g. 500 ppm) to 1070° C. $Cu_2O$ then forms on the surface of the copper shaped part. Copper forms with $Cu_2O$ at 1065° C. a eutetic melt which means that the surface of the copper shaped part is melted on. The melt reacts with the surface of the ceramic parts and wets them. If for example the ceramic parts consists of an aluminium oxide ceramic ($Al_2O_3$) a reaction of the $Cyu_2O$ with $Al_2O$ takes place to give $CuAlO_2$. The wetting of the ceramic surface and of the copper shaped part is very good so that after cooling an extremely firm bonding is present between the copper shaped part and the ceramic.

In the temperature range between 1065° C. and 1083° C. equilibrium obtains between solid copper and the eutectic melt. The copper shaped part is thus not melted in the interior and therefore retains its form up to the melting point of copper (1083° C.). The thickness of the eutectic reaction layer is for example 5 to 10 $\mu$.

What is claimed is:

1. A pressure sensor comprising a base body and a diaphragm which both consist of oxide ceramic or sapphire and are assembled at a defined distance apart parallel to each other to form a chamber therebetween wherein the base body and the diaphragm are joined together by a shaped part of copper which serves as a spacer and is bonded to the two parts by a eutectic melt forming at the surface.

2. A pressure sensor according to claim 1 wherein said shaped part is a ring enclosing said chamber.

3. A pressure sensor according to claim 1 wherein the facing surfaces of the base body and the diaphragm are planar and the distance between the body and the diaphragm is governed solely by the shaped part disposed therebetween.

4. A pressure sensor comprising a base body and a diaphragm which are assembled at a defined distance apart parallel to each other to form a chamber therebetwee, at least one of the two assembled parts consisting of ceramic, glass or monocrystalline material wherein the base body and the diaphragm are soldered together by a shaped part of active solder simultaneously serving as a spacer.

5. A pressure sensor according to claim 4 wherein the base body and the diaphragm are joined together by the shaped part of active solder without previous metallization.

6. A pressure sensor according to claim 4 wherein the active solder is a silver-copper alloy which contains titanium as reactive element.

7. A pressure sensor according to claim 4, wherein the shaped part is a ring enclosing the chamber.

8. Pressure sensor according to claim 4 wherein the facing surfaces of the base body and the diaphragm are planar and the distance between the body and the diaphragm is governed solely by the shaped part disposed therebetween.

9. A method of manufacturing a pressure sensor comprising the steps of providing a base body of oxide ceramic or sapphire, a diaphragm of oxide ceramic or sapphire, and a shaped part of copper, assembling said base body and said diaphragm with said shaped part of copper disposed therebetween as a spacer, introducing said assembly into an inert atmosphere with low oxygen content, and heating said assembly in said atmosphere to a temperature which is lower than the melting point of copper and high enough for a eutectic melt to form at the surface of said shaped part of copper.

10. A method according to claim 9 wherein the parts are heated to a temperature of about 1070° C.

11. A method according to claim 9 wherein the inert atmosphere consists of argon.

12. A method according to claim 9 wherein the inert atmospher consists of nitrogen.

13. A method according to claim 9 wherein the oxygen content of the inert atmosphere is about 500 ppm.

14. A method of manufacturing a pressure sensor comprising the steps of providing a base body of ceramic, glass or a monocrystallin material, a diaphragm of ceramic, glass or a monocrystalline material, and a shaped part of active solder, assembling said base body and said diaphragm with said shaped part of active solder disposed therebetween as a spacer, introducing said assembly into a defined gas atmosphere with a pressure of at the most pb 0.1 mbar and heating said assembly in said atmosphere until complete melting through of the active solder.

15. A method according to claim 14 wherein the gas atmosphere consists of an inert gas.

16. A method according to claim 14 wherein the gas atmosphere consists of a reactive gas.

17. A method according to claim 14 wherein the gas atmosphere consists of a mixture of inert and/or reactive gases.

* * * * *

UNITED STATES PATENT AND TRADEMARK OFFICE
CERTIFICATE OF CORRECTION

PATENT NO.   : 5,005,421
DATED        : April 9, 1991
INVENTOR(S)  : Frank Hegner et al It is certified that error appears in the above-identified patent and that said Letters Patent is hereby corrected as shown below:

Column 4, line 28, change "derS0ing" to --dering--.

Column 4, line 48, change "Cyu$_2$O" to --Cu$_2$O--.

Column 4, line 58, change "$\mu$" to --$\mu$m--.

Column 5, line 11 (Claim 4), change "wee" to --ween--.

Column 6, line 12 (Claim 12), change "atmospher" to --atmosphere--.

Column 6, line 23 (Claim 14), delete "pb".

Signed and Sealed this

Twenty-second Day of September, 1992

Attest:

DOUGLAS B. COMER

*Attesting Officer*   *Acting Commissioner of Patents and Trademarks*